United States Patent [19]

Price et al.

[11] Patent Number: 5,537,459
[45] Date of Patent: Jul. 16, 1996

[54] MULTILEVEL CELLULAR COMMUNICATION SYSTEM FOR HOSPITALS

[76] Inventors: Evelyn C. Price, P.O. Box 29248, San Antonio, Tex. 78229; Cynthia L. Schikal, 19918 Encino Grove, San Antonio, Tex. 78259

[21] Appl. No.: 261,152

[22] Filed: Jun. 17, 1994

[51] Int. Cl.⁶ .................................................. H04Q 7/38
[52] U.S. Cl. .............................. 379/59; 379/58; 379/37; 340/286.07
[58] Field of Search ........................ 379/37, 38, 58, 379/59; 364/413.01–413.09; 455/33.1, 33.4; 340/286.01, 286.06, 286.07

[56] References Cited

U.S. PATENT DOCUMENTS

| | | | |
|---|---|---|---|
| 4,274,753 | 6/1981 | Brown | 400/87 |
| 4,298,863 | 11/1981 | Natitus et al. | 340/573 |
| 4,418,334 | 11/1983 | Burnett | 340/332 |
| 4,455,548 | 6/1984 | Burnett | 340/293 |
| 4,456,793 | 6/1984 | Baker | 379/56 |
| 4,484,367 | 11/1984 | Jenkins | 5/425 |
| 4,506,384 | 3/1985 | Lucas | 455/51 |
| 4,583,084 | 4/1986 | Henderson et al. | 340/573 |
| 4,601,064 | 7/1986 | Shipley | 455/608 |
| 4,633,237 | 12/1986 | Tucknott et al. | 340/573 |
| 4,635,296 | 1/1987 | Dinsmore | 455/113 |
| 4,675,863 | 6/1987 | Paneth | 379/59 |
| 4,790,000 | 12/1988 | Kiroshita | 379/59 |
| 4,792,798 | 12/1988 | Wilowski | 30/696 |
| 4,827,943 | 5/1989 | Bornn et al. | 128/668 |
| 4,835,372 | 5/1989 | Gombrich et al. | 235/375 |
| 4,857,716 | 8/1989 | Gombrich et al. | 235/462 |
| 4,881,271 | 11/1989 | Yamauchi et al. | 379/59 |
| 4,885,795 | 12/1989 | Bunting et al. | 455/5 |
| 4,967,195 | 10/1990 | Shipley | 340/825.52 |
| 5,016,269 | 5/1991 | Rogers | 379/59 |
| 5,303,287 | 4/1994 | Laborde | 379/59 |
| 5,331,549 | 7/1994 | Crawford, Jr. | 364/413.02 |
| 5,349,631 | 9/1994 | Lee | 379/59 |

OTHER PUBLICATIONS

Fitzpatrick and Vineski Jun. 1993 "The Role of Cordless Phones in Improving Patient Care", *Physician Assistant*, pp. 87–88, 92.

*Primary Examiner*—Dwayne D. Bost
*Attorney, Agent, or Firm*—Gunn, Lee & Miller

[57] ABSTRACT

A protocol controlled, four level radio communication system for use in a local area such as a hospital, that provides transceivers for fixed users such as patients, transceivers for mobile users such as health care providers, transceiver stations for each area within which a group of fixed and mobile transceivers operate, and a master command unit centrally located that ties together the transceiver stations and the fixed and mobile transceivers within the system. The patient transceivers permit the patient to select voice or signal transmission to specific or generic receivers. The health care provider transceivers permit the user to selectively receive, respond to, or acknowledge a transmission, or to initiate a transmission in a manner similar to the patient units. The stations have transceiver capabilities and may be staffed or may operate automatically to relay transmissions between transceivers or between other stations within the system. The stations have cellular switching systems that are connected to a number of broadcast antennas throughout the area within which a group of transceivers operate. The single centralized master command unit is connected as a hub to each of the stations to relay communications and to exchange data with the satellite units for identifying the individual transceivers and their locations. The master command unit incorporates external voice and data modem ports to permit the relay of communications from within the system to an outside telephone switching network.

9 Claims, 3 Drawing Sheets

MULTILEVEL CELLULAR COMMUNICATION SYSTEM FOR HOSPITALS

BACKGROUND OF THE INVENTION

1. Field of the Invention

The present invention relates generally to communication systems for use between Multiple Groups of individuals in both stationary and mobile locations. The present invention relates more specifically to an improved communication and calling system for hospitals and the like for use between patients, health care providers, and centralized hospital stations.

2. Description of the Related Art

Communication systems in labor intensive service establishments such as hospitals, hotels, dormitories, and the like have generally involved hard wired intercom systems that allow persons or patients within a particular room of the building to call and communicate with centralized stations so as to request services or to locate needed personnel. The best examples of the state of the art in such communication systems are found in hospitals wherein communication between the generally immobile patient, the centrally located nurses' station, and the generally mobile health care provider is quite critical.

Hospital intercom calling and communication systems are for the most part based upon closed loop, hard wired, localized connections between the patient's room and a central nurses' station. Communication with the health care providers such as the nurses and orderlies on the floor is generally limited to wide area broadcast intercom systems in the hallways or common areas simply because such health care providers are seldom located in any single position in the hotel wing for any length of time.

The basic hospital calling communication systems that have been implemented thus far have a number of fundamental drawbacks. The most important problem derives from the fact such systems are hard wired and not easily modified in their configuration and use. Although patients are, for the most part, immobile in beds in the hospital rooms, problems still occur with intercom systems that include patient units that must be attached to some length of communication cord connecting a microphone/speaker unit with a centralized communication system station. Such permanently installed intercom units are sometimes inaccessible to a patient who has fallen or otherwise prevented themselves from reaching the unit. Apart from providing a communication cord length sufficient for use of the unit anywhere within the patient's room, a design that would be quite cumbersome and impractical, the patient must always insure himself access to the intercom unit where it is permanently located.

A second drawback to the standard hard wired intercom system involves the necessary mobile character of the health care providers that work in the hospital. The solution to the problem thus far has simply been to broadcast intercom requests and messages to all who are within hearing range of a speaker system mounted in the common areas and the hallways of a hospital wing. Although such broadcasts can be and often are restricted to specific hallways and wings where the health care provider is believed to be located, there is little, if any, privacy to be found in the broadcast of the message and no guarantee that the broadcast will be received by the appropriate individual.

In addition, current systems generally require that patient efforts to contact specifically assigned health care providers be relayed through a nurses' station as opposed to being carried directly to the health care provider. As the nurses' station may or may not be staffed at any particular time, a call from the patient to the nurses' station may or may not be immediately received by someone who can thereafter relay it to the appropriate health care provider.

Certainly in cases of emergencies, most current communication systems provide for an alarm system wherein, failing to receive an acknowledgement from an individual at the nurses' station, the patient can signal a critical condition that ought to be responded to by any immediately available personnel.

The drawback to this protocol and system, however, involves the numerous false alarms that occur whenever a patient is simply frustrated in being unable to contact someone at the nurses' station. Something as simple as a request for water could be the basis for signalling an alarm from a patient who is otherwise unable to contact someone for assistance.

The above problems point out additional drawbacks to existing hard wired systems that relate to restrictions on the personnel involved in the operation of the hospital wing. Because of the above problems, it is nearly essential that some staff individual be located at a centralized nurses' station at all times so as to receive and relay messages from the patient rooms to the appropriate health care providers. The limitations of current systems have meant that designating smaller and smaller local responsibility areas is necessary in order for the assigned personnel to adequately handle the needs of the number of patients involved. That is, the more labor intensive a particular communication system is, the more restricted it needs to be in scope and in the number of individuals likely to be involved in the communication efforts. It would be impossible, for example, for an individual positioned at a nurses' station to handle communication requests from in excess of 100 patient rooms and 20 to 30 health care providers when every communication effort must be channeled through the centralized station. Likewise, the chances of a broadcast intercom message being received by the appropriate health care provider in such a large system is small unless a wide area broadcast is utilized in which case a greater lack of privacy occurs.

In summary, the existing hospital communication intercom calling systems are inadequate for four fundamental reasons:

1. Lack of mobility of both patients and health care providers;
2. Lack of privacy for broadcast messages and intercom requests;
3. Lack of accountability for assistance requests and response times; and
4. Restricted system size.

Some efforts in the past have been made to incorporate wireless communication systems within hospitals, but most fall far short of being practical for a number of reasons. In general, the electronics associated with the transmitting and receiving systems necessary for such devices are far too bulky for ease of use either at a bedside location for a patient or in a manner that can be carried with the health care provider as he or she moves about the hospital.

A second problem with current wireless systems relates to directing a specific intercom message or communication to a particular health care provider or a particular station and not directing the same communication to all other potential recipients within a given area. It, therefore, becomes necessary to electronically identify a recipient and isolate the transmission to that particular recipient's transceiver unit. Efforts in the past to resolve this problem have been quite limited.

It would, therefore, be desirable to have a communication intercom calling system that permits limited mobility for individuals who are generally fixed in position within the system (such as patients), full mobility for individuals who are generally not fixed in their location in the system (such as health care providers), and centralized communication controls at fixed satellite stations and a single centralized building station within the system. It would be desirable if this wireless communication system were capable of handling a large number of "calls" or communication "paths" simultaneously as with a protocol similar to the larger scale cellular telephone communication systems currently in use. It would be desirable if such system would involve low power transmission and reception requirements and would include a means for identifying specific transmitters and receivers with information on the individuals utilizing such devices. It would be desirable to incorporate a response tracking and accountability system into the communication system in a manner that insures an accurate logging of all communications that occur. It would further be desirable if such a system could easily interface into either existing cellular telephone or hard wired telephone communication systems external to the building wherein the system is installed.

SUMMARY OF THE INVENTION

Accordingly, an object of the present invention is to provide a communication intercom and calling system for use in localized areas that involve stationary, mobile, and centralized transmitting and receiving locations.

It is a further object of the present invention to provide a communication system for use in a localized area by stationary and mobile individuals such as in a hospital environment that permits wireless communication in instances where mobility is important and permits interface with wired communication systems exterior to the localized system.

It is a further object of the present invention to provide a means for communication between stationary and mobile individuals within a localized area that permits multiple communications to occur at the same time between individuals within the system and the efficient identification and switching of communication channels as needed between the individuals within the system.

It is a further object of the present invention to provide a wireless communication system for use in localized areas such as hospital environments that permits the maintenance of a record of transmissions and receptions and a means for tracking the accountability of individuals within the system who are responsible for receiving and responding to communications.

It is a further object of the present invention to provide a communication system for a localized area such as a hospital environment that can be configured according to the size needs of a particular environment and can easily be modified through the addition of further individuals within the system or the break up of the communication system into sub-networks.

It is a further object of the invention to provide a communication system for environments such as hospitals that utilizes four levels of communications, namely a first semi-stationary level for individuals such as patients within a hospital; second, a fully mobile level for individuals such as health care providers within a hospital; third, a centralized satellite station level capable of communicating with each of the first two levels and responsible for coordinating and relaying communications among the first three levels; and fourth, a single centralized master control level responsible for maintaining data on the overall system configuration and for relaying communications between satellite stations and from within the system to the outside world.

In fulfillment of these and other objectives, the present invention provides a modularly structured communication system for use in a localized area such as within a hospital environment that provides transceiver units for partially mobile individuals such as patients, transceiver units for completely mobile individuals such as health care providers, stationary satellite units proximate to an area within which the patient and health care provider units would operate, and, finally, a master command unit typically located in a single, centralized position within the hospital that ties together the satellite units and thereby ties together each of the modular transceiver units within the system. The master control unit would be responsible primarily for the maintenance of data on the various elements within the system and for the communication of telephone transmissions from within the system to the outside world through modem and/or telephone switching lines.

The present invention provides patient unit transceiver units that incorporate a selection of small buttons that allow the patient to designate the specific type transmission he or she wishes to make. Likewise, the health care provider transceiver unit provides a variety of control buttons that allow the user to selectively receive, relay, or acknowledge a transmission or to initiate one in a fashion similar to that for the patient unit. The satellite station unit incorporates transceiver capabilities and may be staffed by a third party individual within the communication system and/or may operate automatically to relay messages on communication lines between other transceiver units within the system. The satellite station unit incorporates a cellular telephone switching system connected to a plurality of cellular telephone broadcast antennas throughout the localized area within which the system operates. This permits a large number of independent communications to occur simultaneously much as in broad range cellular telephone systems.

Finally, the present invention incorporates a master command unit that is hard wired to each of the satellite stations in a manner that allows the transmission of relevant data between the master command unit and the satellite stations, such data being pertinent to the identification of the individual transceiver units their interactive responsibilities and their possible locations. The master command unit also incorporates communication ports and external modem ports that permit the relay of communications in the nature of telephone calls from within the system to outside telephone switching networks. Other objects and advantages over the prior art will become apparent to those skilled in the art upon reading the detailed description below together with the drawings as described as follows.

DESCRIPTION OF THE PREFERRED EMBODIMENT

While there are a number of different applications of the system of the present invention for use in localized areas where communications between individuals is critical and the individuals may either be stationary or mobile and varying greatly in number, the preferred embodiment of the invention is described as it might be incorporated into a hospital environment that includes patients, health care providers, and stationary management personnel. It is understood that many other environments could equally apply the principles of the present invention through the use of the various units of the invention according to the needs of the individuals within the environment. Therefore, environments such as dormitories, prisons, hotels, large businesses, office buildings, etc. could all benefit from the use of the system described.

Figure 1:
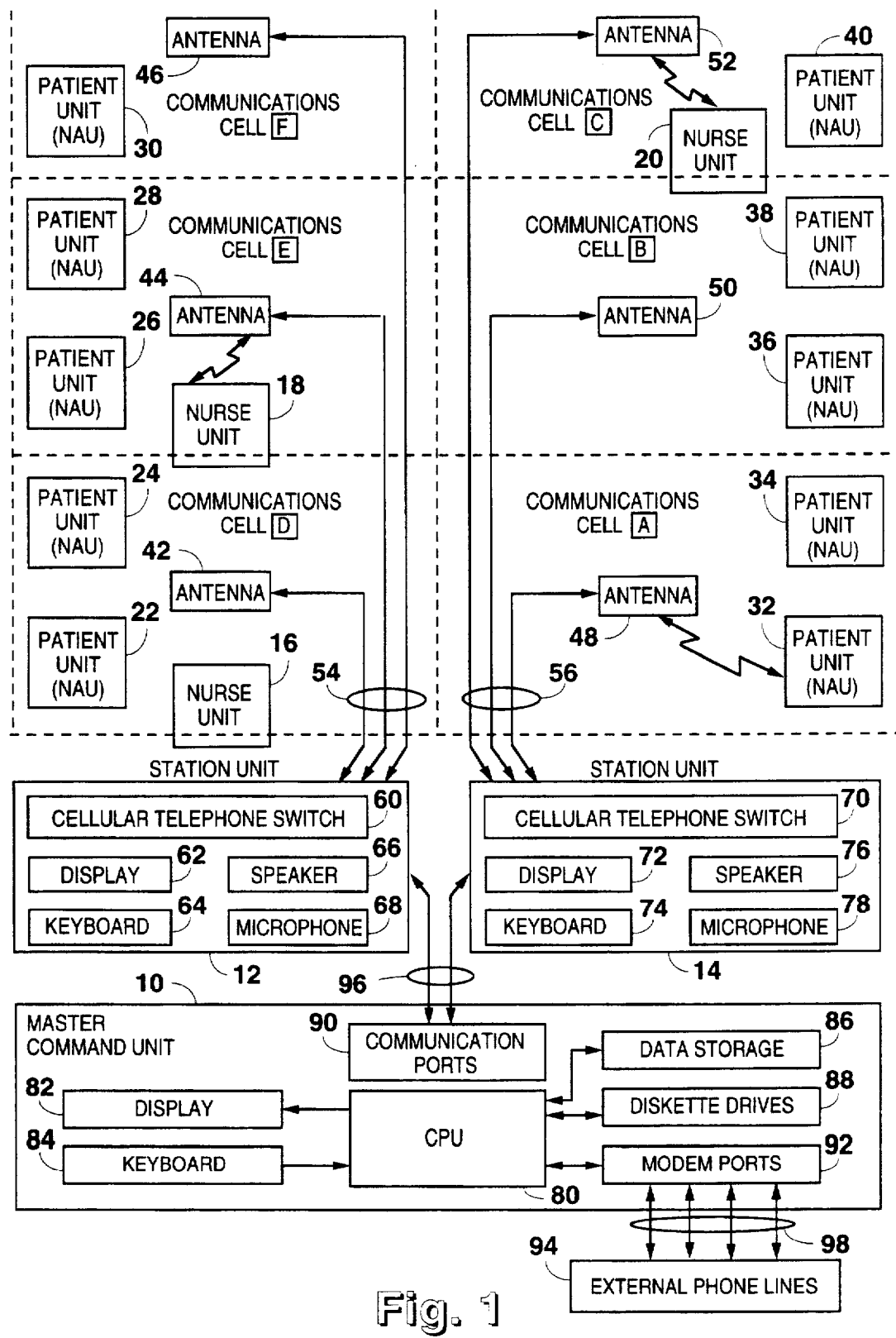
FIG. 1 is a schematic block diagram showing the various modular components of a representative portion of the complete system of the present invention and each component's approximate functional position within the system.

Reference is first made to FIG. 1 for an overview of the entire system of the present invention. The functional block diagram shown in FIG. 1 is a representative portion of a system that could vary in size and therefore, in the number of modular units according to the needs of the environment. The system shown in FIG. 1 incorporates a single master level unit, which would be typical in most every instance, and (2) representative satellite station units, which would likely be small in number as compared to standard installation. Likewise, the remaining modular units shown in FIG. 1 are intended to be representative of a total and would, in most cases, be only a section or a small portion of the overall installation. In a hospital, for example, there may be a patient unit for each and every bed, which, for some hospitals, might number in the thousands. Likewise, for the nurse units shown in FIG. 1, the numbers would be significantly greater than those represented.

At the lowest level of the system described, the present invention incorporates master command unit 10. Typically only one such master command unit 10 would exist for any specific installation. Master command unit 10 is in hard wire communication with satellite station units 12 and 14, again representing perhaps a larger number of such units, all of which would be in communication with master communication unit 10. Satellite station unit 12 in the representative example shown in FIG. 1 is capable of directly communicating with nurse unit 16 shown in communication cell D as well as nurse unit 18 shown in communication cell E. Likewise, satellite station unit 12 is capable of communicating with patient units 22 and 24 within communication cell D, patient units 26 and 28 within communication cell E, and patient unit 30 within communication cell F. Satellite station unit 14 is capable of communicating with nurse unit 20 within communication cell C, as well as patient units 32 and 34 within communication cell A, patient units 36 and 38 within communication cell B, and patient unit 40 within communication cell C.

The various communication cells A through F are established by means of localized cellular transmission areas generating from low power transmissions via an array of antennas, one within each communication cell. Thus, in FIG. 1, antenna 42 establishes communication cell D in a localized area as does antenna 44 communication cell E, antenna 46 communication cell F, antenna 48 communication cell A, antenna 50 communication cell B, and, finally, antenna 52 communication cell C.

The primary functional components of satellite station units 12 and 14 are cellular telephone switches 60 and 70, respectively. These cellular telephone switching systems incorporate low power broadcast transceivers that can both generate and relay communications among the units within the system. As indicated above, the technologies and methods associated with the cellular communication protocols described herein mimic closely the technology and methods associated with broad area cellular telephone communication, albeit at a much lower power at different frequencies, and over a much more localized area. The purpose of this cellular switching system is to permit multiple communications to occur within a limited set of frequencies within a given area. The low power transmissions permit a communication to occur between a unit within communication cell D and antenna 42 therein, at a frequency identical to a communication that might at the same time be occurring between patient unit 40 in communication cell C and antenna 52 located therein. The objective, therefore, is to permit a large number of communications to occur over a selected few frequency bands. Other technologies associated with cellular telephone switching systems are also incorporated in the system of the present invention. The ability of a cellular telephone switching system to "hand off" a mobile unit is utilized as, for example, nurse unit 20 in communication cell C may be handed off to a different communication cell automatically without the breakdown of the established communication link.

In addition to acting as a satellite cellular telephone switching unit, satellite station units 12 and 14 are also capable of originating transmissions and being the destination of other transmissions received at the station unit. Satellite station units 12 and 14, therefore, incorporate speakers 66 and 76 so as to broadcast messages to an individual staffing the units and microphones 68 and 78 to prevent the origination of communications from the units.

In addition, however, satellite station units 12 and 14 incorporate computer displays 62 and 72 as well as computer keyboard entry devices 64 and 74. The combination of displays 62 and 72 and keyboards 64 and 74 permit an individual staffing the station unit to manually control, monitor, and log the communications within the system that the station unit is responsible for. These functions are described in more detail below.

It can be seen that based on standard cellular telephone switching and transmission technologies, satellite station units 12 and 14 are connected to antennas 42 through 52 by way of separate coaxial transmission lines generally grouped as 54 and 56. Each satellite station unit would be responsible for a specified number of communication cells, each of such cells would therein contain an antenna independently attached to the satellite station unit. In the preferred embodiment, it is anticipated that 10 or more such communication cells might derive from a single satellite station unit and would be associated with as few as one patient room per communication cell or as many as four or five patient rooms per communication cell depending upon the size of the environment, the power level of the transmissions, and the potential for interference within the environment.

Communication from one station unit to another, as from station unit 12 to station unit 14 as shown in FIG. 1, is accomplished through master command unit 10. Anytime one of the modules found within the communication cells under the control of station unit 14 wishes to communicate with a module in another station unit, cellular telephone switch 70 within station unit 14 communicates the request by way of communication line 96 to master command unit 10 by way of communication ports 90 within the unit. Under the control of CPU 80 within master command unit 10, the communication is routed to the appropriate station unit, station unit 12 in this example, again by way of communication cable 96 through to cellular telephone switch 60 within station unit 12, at which point the appropriate communication cell is identified. It now becomes apparent, at least for those units identified as nurse units within FIG. 1, that units that are mobile and likely to move from one communication cell to another, the identification of the location of the unit may not depend upon pre-stored data with respect to that unit, but would depend upon the ability to transmit and receive coded identification signals such that only the intended mobile unit would be alerted to an incoming communication. Here again the technology and processes associated with such requirements are well known in the field of broad area cellular telephone communications. Similar processes and procedures are incorporated in the present invention wherein a constant identification of the location for a particular mobile unit is maintained whenever the unit itself is powered on. A background transmission, therefore, occurs as a mobile unit moves from cell to cell and the location identification information in master command unit 10 is up-dated.

For example, in FIG. 1 as nurse unit 20 might move from communication cell C to communication cell E, background signal transmissions identifying nurse unit 20 would change from being received by station unit 14 to being received by station unit 12 at antenna 44. Location information stored in master command unit 10 would be updated with this new location information for nurse unit 20. Should nurse unit 20 or any of the patient units described not be powered on or not be entered into the system, master command unit 10 would show those units to be unavailable for communication. This updated information could be maintained in redundant fashion by the combination of manual input into master command unit 10 or automatic identification of active status through background identification transmissions to satellite station units 12 and 14. Master command unit 10 would be initially programmed with unit identifications and system structure information by way of display 82, keyboard 84, and programming of CPU 80. Diskette drives 88 and data storage 86 provide the necessary records for maintaining both the structure of the system and the identities of the units within it. Modem ports 92 allow master command unit 10 to communicate by way of hard wire communication lines 98 to external phone lines 94 and an external phone switching network.

Reference will again be made to FIG. 1 below for a detailed description of a typical communication link establishment for the present invention after more detailed descriptions of the individual units within the system is made with respect to FIGS. 2 through 5.

Figure 2:
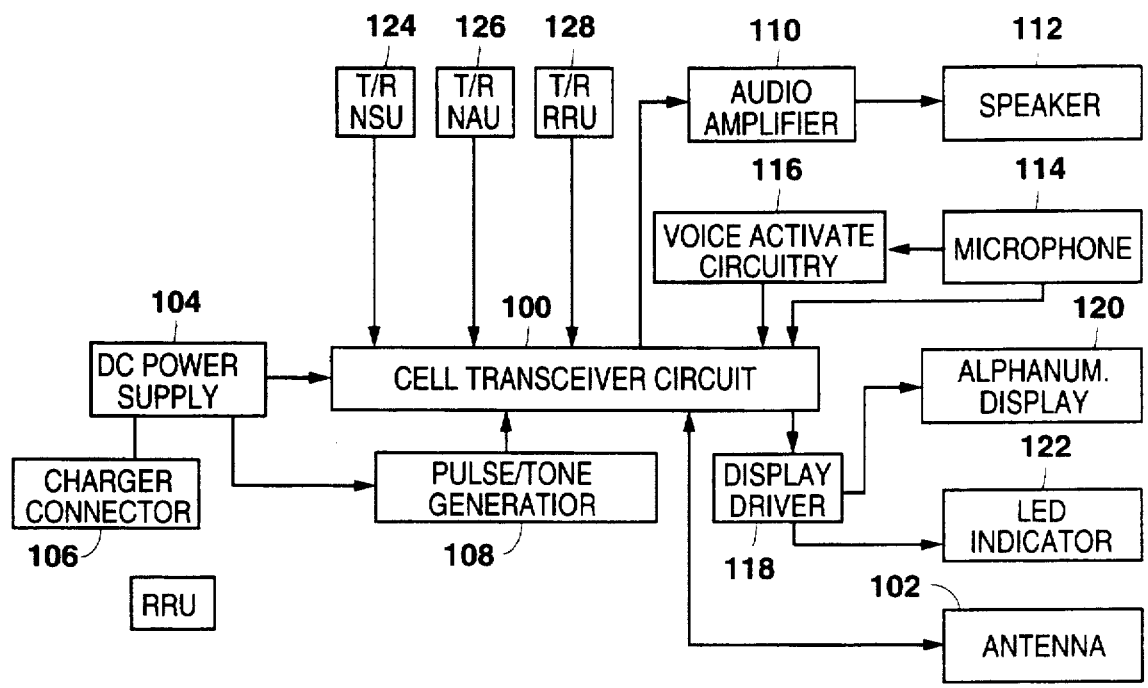
FIG. 2 is a detailed block diagram showing the functional components of the mobile transceiver units identified as "nurse units" in FIG. 1 or "remote response unit" in the text.

Referring to FIG. 2, a detailed block diagram of the functional components of a "remote response unit" generally designated as "nurse units" in FIG. 1 is provided. The central element of the remote response unit is a cellular transceiver circuit 100 that provides the means for transmitting and receiving communications and messages as well as the above mentioned identification signals and acknowledgements. Cell transceiver circuit 100 is a low power, local area transceiver capable of receiving and broadcasting transmissions over an area generally limited to a line of sight range of 30 to 60 feet. The purpose of this limited power is that described above with respect to the advantages of multiple communications occurring over the same frequency within a larger area that includes many cells.

The remote response unit is intended to be completely mobile in nature and to be easily carried by a health care provider in a hospital environment. Cell transceiver circuit 100 is, therefore, powered by a small DC power supply 104, typically a rechargeable battery. Charger connector 106 provides a means for recharging the power supply 104 either within the remote response unit or removed from the unit. Ancillary to cell transceiver circuit 100 is pulse tone generator 108 appropriate for signaling purposes and/or for generating telephone number, unit identification, and other signal control frequency pulses typically utilized in cell based communication systems. Pulse tone generator 108 provides all the necessary communication protocols not provided by voice transmissions.

Cell transceiver circuit 100 is connected to audio amplifier 110 and thereby to speaker 112 for the broadcast of received messages and/or signal tones. Likewise, cell transceiver circuit 100 is connected to microphone 114 directly for the reception of voice transmissions from the individual using the unit and indirectly through voice activating circuitry 116, which simply alerts cell transceiver circuitry 100 and activates necessary elements within the circuitry to the reception of a voice transmission through microphone 114.

Cell transceiver circuit 100 is capable of receiving nonvoice signal transmissions and relaying appropriate signals, numeric indications, and displays through display driver 118 to alphanumeric display 120 and to LED indicator 122. Uses and capabilities of alphanumeric display 120 and LED indicator 122 will be described in more detail below. Cell transceiver circuit 100 accomplishes its radio frequency (cellular) low power transmissions and receptions by way of antenna 102.

The health care provider utilizing the remote response unit is provided with means for selecting the communications channel desired or requested. Control switches 124, 126, and 128 allow the user to direct the cell transceiver circuit 100 to address or call a specific communications channel, again, by way of coded signal information transmitted by the unit. Control switch 124 allows the user to select transmission or reception to or from a satellite station unit such as unit 12 in FIG. 1. By pressing a momentary button switch for control switch 124, the user "opens a channel" between the transceiver unit and the satellite station unit associated with the communications cell that the remote response unit is located within. In similar fashion, control switch 126 establishes a communication path between the remote response unit and a patient unit such as patient unit 30 shown in FIG. 1. Finally, control switch 128 establishes communication between the remote response unit and a second remote response unit as appropriate. In most instances, these control switches would be touched and activated by the user when a communication has been directed to the remote response unit from another source. These buttons would, therefore, act as acknowledgements and clearances to receive a message from the transmitter.

As one objective of the present invention is to simplify the electronic devices that are required within the system, the remote response mobile unit described in FIG. 2 does not incorporate a means for independently specifying a specific patient or other remote response unit that a transmission response is to be directed toward. A key pad on a standard cellular telephone would generally provide such a means for selecting a particular destination for a transmission. While such a key pad could be incorporated into the remote response unit as shown in FIG. 2, it is anticipated in the preferred embodiment that alternative means for directing a communication are available and the benefits of the simplicity of the system shown outweigh the advantages of having the key pad available.

If an incoming "call" is from a patient unit, the remote response unit will display the numeric room number for the patient and allow the nurse to (1) respond directly to the patient, (2) respond to the station unit so as to request that someone else respond to the patient, or (3) respond to another nurse in the vicinity (as identified by data in the master command unit). In order to initiate a transmission from the remote response unit, the user would, absent the indication of an incoming communication, touch one of the control buttons 124, 126, and 128, and would immediately be connected to a staff person located at the satellite station unit that had control over the communication cells that the remote response unit is in. If communication is desired with the satellite station unit, such transmission and reception would thereafter be carried out. On the other hand, if communication was desired with a patient unit or another nurse, the individual staffing the satellite station unit would either be so notified verbally by the remote response unit user or would receive indications of the same on the display at the satellite station unit pursuant to signals generated by the appropriate button 126 and 128 having been pressed by the user. In this case, an inquiry of the user as to the destination of the transmission would be made and appropriate routing would be provided by the individual through keyboard entry as described in more detail below.

Figure 3:
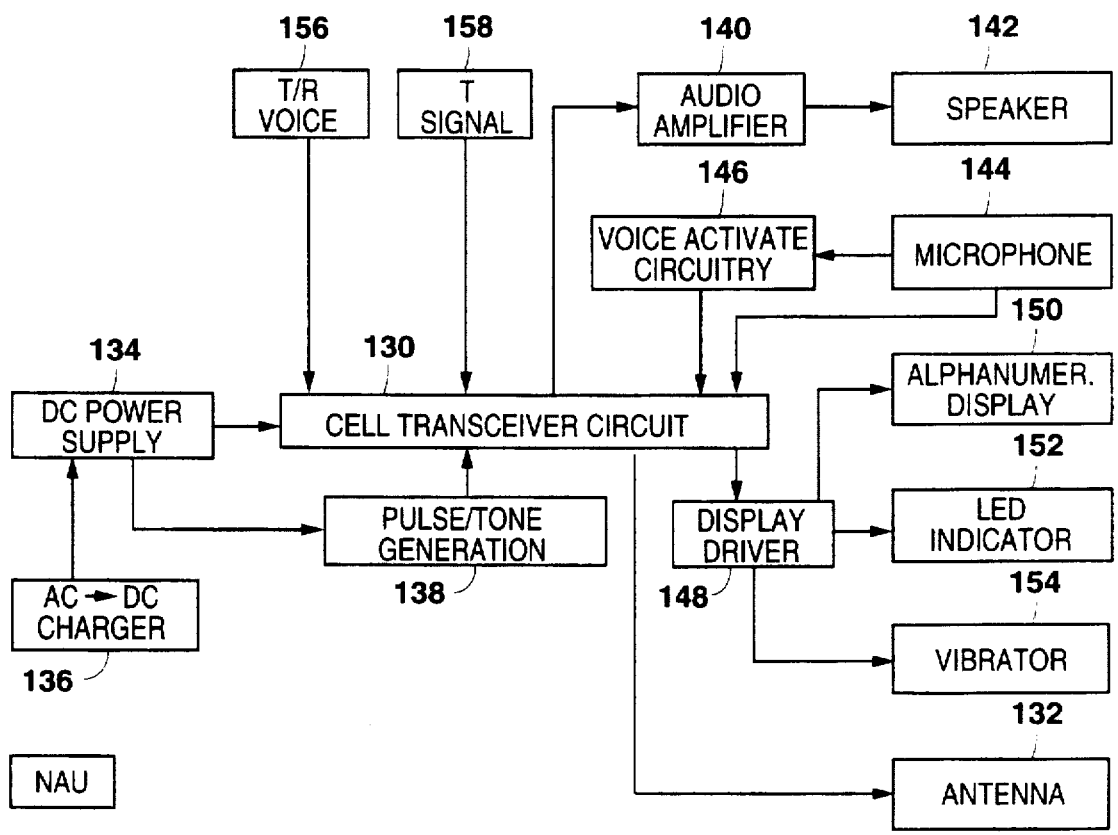
FIG. 3 is a detailed block diagram showing the functional components of the semi-mobile transceiver unit identified as "patient units" in FIG. 1 or "nurse aid unit" in the text.

Reference is now made to FIG. 3 for a description of the detailed structure of the fundamental components of the semi-mobile patient unit of the present invention. In many respects the structure of the nurses aid unit located in a patient's room, preferably adjacent to the patient's bed, is similar in most respects to the structure of the remote response unit. As indicated in a description of the prior art, it would be desirable to have the patient unit semi-mobile so as to facilitate its use by the patient even though it is anticipated the unit would remain within the room for the most part. On the other hand, it is anticipated that in some cases a particular unit assigned to a patient might preferably travel with the patient, not only within the wing of the hospital, but in instances where the patient might be moved from one room to another or might proceed from a recovery room to a patient room over a period of days.

It is, therefore, preferable that the "semi-mobile" patient units of the present invention in fact be fully mobile since their specific location can be confirmed by way of the previously mentioned signal identification system and/or through manual programming of the master control unit. For example, when a patient checks into the hospital, he or she might be assigned a particular patient unit and an initial location identification would be programmed in association with that unit. However, the system would be capable of modifying the location information depending upon actual location as confirmed by the signal identification means. For the purposes of the present discussion, however, it is easier to speak of the patient units as being "semi-mobile" simply to distinguish them in their primary use from the more completely mobile health care provider unit.

As with the remote response unit, the central functional element of the nurse aid unit or patient unit is cell transceiver circuit 130. Cell transceiver circuit 130 is powered by DC power supply 134, again, a battery in the preferred embodiment. In the case of the semi-mobile unit, an AC to DC charger 136 is provided and may act as the semi-permanent repository of the unit adjacent to the patient's bed. It is not uncommon for either cellular telephones or pager units to be placed within chargers while power to the unit is maintained on for the reception and transmission of communications. Such a procedure and structure would be implemented in the present invention.

Pulse tone generator 138 serves the same function as described above with respect to the remote response unit in FIG. 2. In similar fashion, audio amplifier 140, speaker 142, microphone 144, and voice activation circuitry 146, all carry out the necessary transmission and reception functions for the transceiver unit. Display driver 148 is similar to the display driver shown in FIG. 2 and controls alphanumeric display 150, LED indicator 152, and, in this case, a supplemental vibrator indicator 154. It is anticipated that the patient unit may require a silent signal in lieu of a visual signal.

Activation of cell transceiving circuit 130 is accomplished either by way of voice activation circuitry 146 or through manual activation of control switches 156 and 158. Functioning similar to the nurse unit control switches described above, switch 156 initiates a voice path communication signal and switch 158 initiates a coded non-voice communication signal. Switch 158 may be used in the case of an effort to call a station or in an emergency situation. Switch 156 would simply be a means for initiating communication between the patient unit, and a satellite station unit or a nurse's remote unit.

Figure 4:
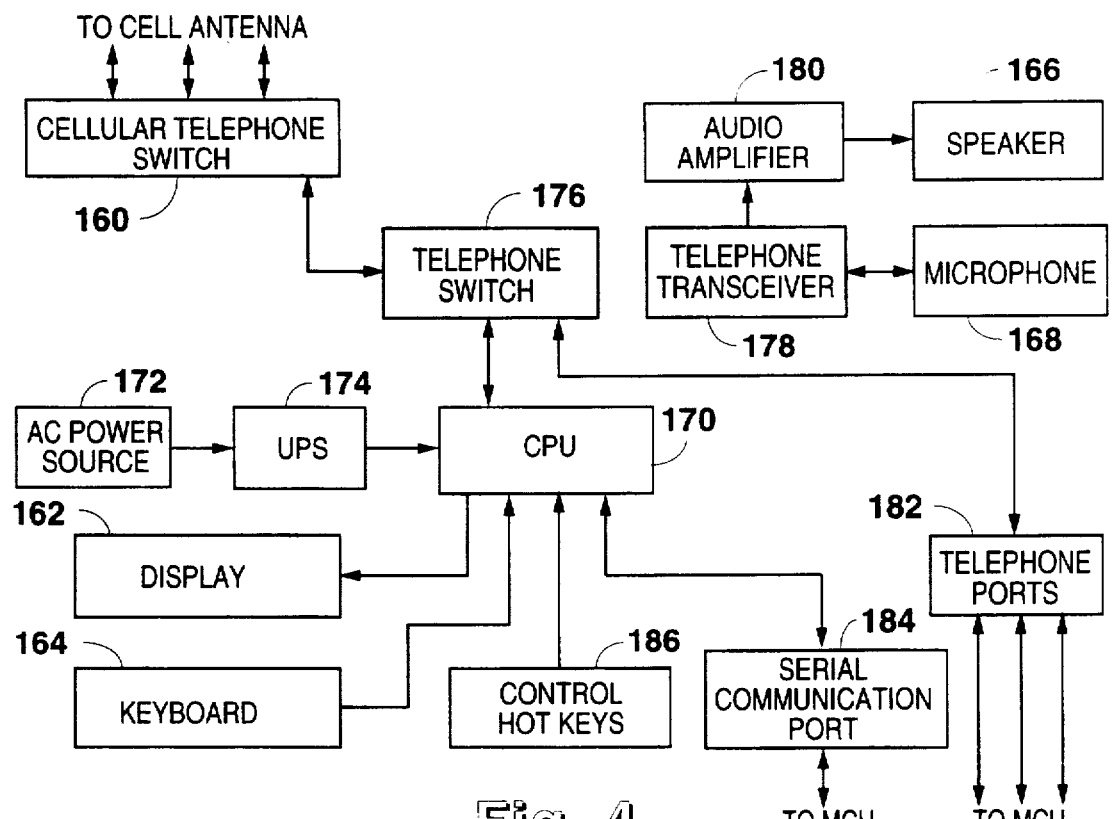
FIG. 4 is a detailed block diagram showing the functional components of the fixed transceiver unit as "station units" in FIG. 1 or "nurse's station unit" in the text.

Reference is now made to FIG. 4 for a detailed description of the fundamental functional components of the satellite station unit of the present invention. Since the satellite station unit acts as the central hub for a plurality of communication cells, one of its central functional features is cellular telephone switching circuitry 160. Telephone switch 160 is connected by way of hard wire coaxial cables to each of the cell antennas as described above in FIG. 1. Coupled with cellular telephone switch 160 is a hard wire telephone switch 176 which serves two purposes.

First, it accomplishes the relay of communication paths from units within the system to other units within the same system by routing them back through cellular telephone switch 160 through the appropriate antenna coaxial cable. Thus, a call coming in from a patient unit within a first communication cell within the local cell group to a second communication cell also under the control of the same station unit would be routed through cellular telephone switch 160 to telephone switch 176 back through cellular telephone switch 160 and out through a second coaxial cable line.

Secondly, telephone switch 176 serves to direct communication paths from units within the cell group under the control of the particular station unit through to other station units as described in more detail below.

Since the station units must act as transceiver units themselves, an appropriate telephone transceiver circuit 178 is coupled with audio amplifier 180, speaker 166, and microphone 168 to provide the necessary transmission and reception capabilities. For communication paths outside of the system under the control of this particular station unit, telephone ports 182 direct a number of hard wire communication lines to the master command unit for subsequent distribution and switching to the appropriate destinations. All of this is accomplished under the control of CPU 170 which has contained within it specific commands and data for appropriately identifying, directing and controlling the communication paths. This information can be reprogrammed or can be supplemented from information contained in the master command unit by way of serial communication port 184. It is anticipated that the satellite units are in constant data communication with the master command unit by way of serial communication port 184 in addition to telephone ports 182 that permit constant voice and signal communication paths between the units.

The station unit is powered from DC power source 172 by way of uninterruptable power supply 174. Use of the satellite station unit is facilitated by display 162 and keyboard 164. In addition, certain actions commonly required of an individual staffing the satellite station unit are provided for by way of control hot keys 186. Examples of control hot keys 186 would include an answer back signal, a numeric pad with transmission relay buttons for situations where the individual staffing the satellite unit receives a request to complete a communication path to a specific patient unit, or other such common control actions.

Figure 5:
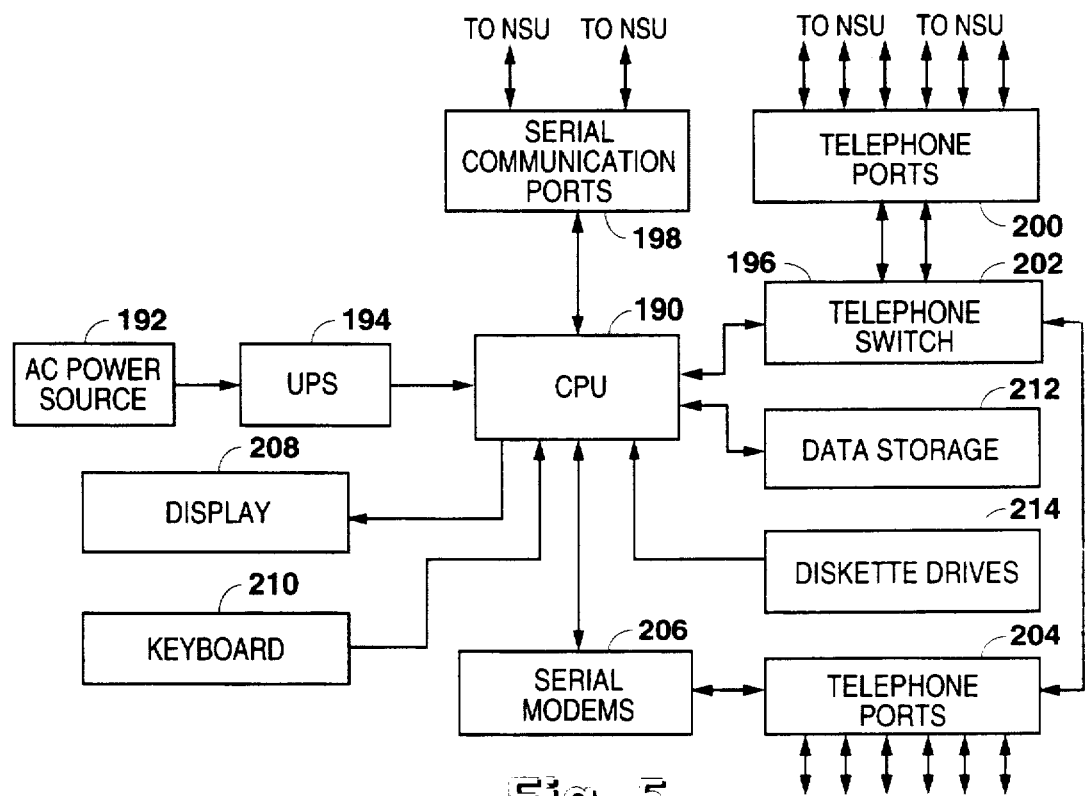
FIG. 5 is a detailed block diagram showing the functional components of the fixed control unit identified as "master command unit" in FIG. 1 and in the text.

Reference is now made to FIG. 5 for a detailed description of the functional components of the master command unit typically associated with the present invention. The central functional element of the master command unit is CPU 190 which serves to control serial communication ports 198 that are in datalink communication with each of the satellite station units within the system. It is through serial communication ports 198 that identification data and location information are provided to each of the satellite units and through which appropriate switching of the communication paths can occur. As indicated above, parallel to serial communication ports 198, telephone ports 200, which provide the actual hard wire communication paths that transmissions and receptions through the system may travel. As indicated above, communication paths that fall entirely within the cell group confines of a single satellite station unit are relayed completely within that unit whereas any communication paths that travel outside of the cell group dedicated to a particular satellite station unit must travel through the master command unit to another satellite station unit, and thereafter to their intended destination. All of this is further facilitated by telephone switch 196, also under the control of CPU 190. Programming, data maintenance, etc. are facilitated by display 208, keyboard 210, data storage 212, and diskette drives 214. Power to the master command unit is provided from AC power source 192 through uninterruptable power supply 194. Communication with telephone switching systems external to the overall system of the present invention is made through serial modems 206 and telephone ports 204.

Reference is now again made to FIG. 1 for a description of the establishment of a typical communication path within the system of the present invention. One of the advantages of the present system is that it allows a particular individual such as a patient to directly communicate with a health care provider responsible for that patient. Patient unit 32, for example, in FIG. 1 might initiate a communication with the appropriate health care provider for the patient by pressing the transmit signal button 158 (FIG. 3) on the patient unit. This would initiate a transmission to antenna 48 within communication cell A of a signal appropriate for establishing a communication path to the nurse unit associated with this particular cell group. Antenna 48 relays this signal communication by way of coaxial cable 56 to station unit 14 wherein it is received and acknowledged as a request to communicate with or signal the nurse or the health care provider assigned responsibility for that patient. If the nurse is within the system under the control of satellite station 14, as with nurse unit 20 shown in communication cell C, station unit 14 would confirm this and redirect the signal transmission back along the appropriate coaxial cable 56 to antenna 52 within communication cell C and thereafter to nurse unit 20.

On the other hand, assuming that the health care provider associated with patient unit 32 is in fact nurse unit 18. Not being within the same cell group, the communication from patient unit 32, after being conveyed to station unit 14, would have to be routed to station unit 12 through the appropriate communication ports 90 in master command unit 10. All of this would occur based upon the identified location of nurse unit 18 within communication cell E. This information would be made available to station unit 14 from master command unit 10 and would direct the transmission through master command unit 10 instead of back out into one of the communication cells in the cell group associated with station unit 14. Once the communication path has been established by nurse unit 18 acknowledging and receiving the transmission, the path would remain for the duration of the message. Each of the buttons on either nurse unit 18 or patient unit 32 would act to "hang up" on the communication when termination was desired.

Communication between two nurse units would be established and carried out in much the same fashion. Nurse unit 20, for example, located in communication cell C in FIG. 1 would initiate a transmission by pressing the appropriate button, which would signal the request for a communications path to station unit 14. Being unable to automatically identify destination, the individual associated with nurse unit 20 would have to identify the desired destination to the staff individual handling station unit 14. Thereafter, by way of keyboard 74 entry, station unit 14 would establish communication path again through master command unit 10 to station unit 12 to nurse unit 18, for example, in communication cell E.

As long as location information is maintained either through manual entry as described above or through automatic signal identification, any communication path may be established whether within a station unit's cell group or to another cell group by way of master command unit 10.

An ancillary function of the system described and mentioned briefly above involves the logging and tracking of accountability for responses under requests made within the system. As indicated above, a nurse unit that has been notified of a communication request may, depending on the circumstances, acknowledge and respond to the request by opening a communications path to the patient requesting the same or may request other nurse units to respond to this communication path request and the patient's needs. This alternate response could be directed to other nurse units in generally within a specified area, a backup nurse unit whose identity is programmed into the system, or simply to the station unit which would thereafter select an appropriate backup destination for the request. A variety of protocols could be programmed into the system depending upon the specific needs of the environment, the number of health care providers, and the nature of the patient's request. In this manner, the patient unit is anticipated to also include the ability to designate an emergency condition that would prompt signals calculated to bring about a more immediate response. Thus, under certain conditions, a specific button pressed by the patient on the patient unit could prompt not only transmission to the nurse unit associated with that patient, but to any and all nurse units within communication cells immediately adjacent to the patient unit. Such an emergency signal could at the same time designate a response from the staff individual at the station unit associated with that cell group.

In summary, it can be seen that one of the goals of the present invention is to provide a versatile, flexible system that can be configured according to the particular environment needs and the number of individuals within the system. Even within a specific application, such as a hospital environment, the system can be programmed to accommodate protocols that vary according to established hospital procedures and/or specific hospital wing requirements. Who receives a transmission and who is obligated to respond can all be programmed and handled differently depending upon the protocol desired by the user. Each of these variations, however, falls within the scope of the present invention insofar as its modular nature lends itself to each of these various configurations.

We claim:

1. A system for voice and data communication, within a localized area, between individuals and stations that may be either fixed or mobile within said area, said system comprising:

a plurality of mobile transceiver devices, said mobile transceiver devices having means for transmitting and receiving low power radio frequency transmissions, each of said mobile transceiver devices uniquely associated with an individual user and having means for transmitting a radio frequency identification signal;

a plurality of fixed transceiver devices, said fixed transceiver devices having means for transmitting and receiving low power radio frequency transmissions, each of said fixed transceiver devices uniquely associated with an individual user and having means for transmitting a radio frequency identification signal, each of said fixed transceiver devices further identified with a specific location within said localized area;

a plurality of transceiver stations, each of said transceiver stations comprising:
a radio frequency transceiver;
a communication switching device;
a plurality of antenna devices, said antenna devices capable of receiving and transmitting low power transmissions to and from said mobile and fixed transceiver devices located within a communication cell surrounding said antenna, to and from said transceiver station; and
a communication identification and control processor for tracking said mobile and fixed transceiver devices within said communication cells by recognizing said identification signals and further for identifying communications paths between each of said fixed transceiver devices and at least one of said mobile transceiver devices; and a keyboard input device, said keyboard input device for modifying said identification and location information and further for modifying said communication paths at least one control and relay station, said control and relay station comprising:

a microprocessor;
a plurality of data communication ports;
a plurality of voice communication ports; and
a communication identification and control processor for receiving and storing locational information on each of said plurality of mobile and fixed transceiver devices, said locational information communicated from said plurality of transceiver stations, said locational information for appropriately routing and relaying communications between said mobile and fixed transceiver devices and said transceiver stations;
said control and relay station in hardwire communication with each of said transceiver stations, said control and relay station having means for relaying said low power transmissions from and between said transceiver stations.

2. The system of claim 1 wherein each of said plurality of transceiver stations further comprises:

a plurality of data communication ports, said data communication ports for communicating said identification and location information to and from said control and relay station;

a plurality of voice communication ports, said voice communication ports for relaying said voice communications between said mobile and fixed transceiver devices, to and from other of said transceiver stations and to and from said control and relay station;

a video display, said video display for visually displaying said identification and location information and for visually displaying an establishment of a communication path between any of said mobile and fixed transceiver devices;

3. The system of claim 1 wherein said control and relay station further comprises:

a telephone switching device;
a plurality of external voice communication ports, said external voice communication ports for relaying said voice communications from said transceiver stations to and from external telephone network systems.

4. The system of claim 1 wherein each of said plurality of activation switches on each of said mobile transceiver devices further comprise:

an audio microphone;
an audio speaker;
an alphanumeric display; and
a plurality of activation switches for selectively responding to, initiating, or relaying a radio frequency communication, said plurality of activation switches comprising:

means for activating a communication path between said mobile transceiver device and one of said fixed transceiver devices;

means for activating a communication path between said mobile transceiver device and one of said transceiver stations: and means for activating a communication path between said mobile transceiver device and another one of said mobile transceiver devices.

5. The system of claim 1 wherein each of said plurality of fixed transceiver devices further comprise:

an audio microphone:
an audio speaker; and
a plurality of activation switches for selectively responding to or initiating a radio frequency communication, said plurality of activation switches comprising:

means for activating a communication path between said fixed transceiver device and one of said mobile transceiver devices;

means for activating a communication path between said fixed transceiver device and one of said transceiver stations.

6. A method for voice and data radio communication within a localized area between individuals and stations that may be either fixed or mobile within said area, said method comprising the steps of:

providing a plurality of mobile transceiver devices;

providing a plurality of fixed transceiver devices;

providing a plurality of transceiver stations;

providing at least one centralized control and relay station;

identifying each of said plurality of fixed transceiver devices with a specific user;

identifying each of said fixed transceiver devices with a specific physical location within said localized area;

for each of said fixed transceiver devices, identifying at least one of said mobile transceiver devices with which to establish default communications;

storing said identifying information about said fixed and mobile transceiver devices in a memory means provided within said plurality of transceiver stations;

establishing a communications path between one of said plurality of fixed transceiver devices and its assigned associated mobile transceiver device, said step of establishing a communications path comprising;

activating a call switch on said fixed transceiver device;

transmitting an identification signal from said fixed transceiver device to one of said transceiver stations;

receiving said identification signal at said transceiver station;

identifying said communications path with one of said mobile transceiver devices pre-assigned to be associated with said identified fixed transceiver device; and establishing said communications path by transmitting a signal to said identified associated mobile transceiver device, said signal comprising a means for activating an alert mechanism provided on said mobile transceiver device and a means for identifying the physical location of said communication from said fixed transceiver device on an alphanumeric display provided on said mobile transceiver device.

7. The method of claim 6 further comprising the steps of:

responding to said communications path by activating said mobile transceiver device and establishing a talk path between said mobile transceiver device and said fixed transceiver device.

8. The method of claim 6 further comprising the steps of:

responding to said communications by activating said mobile transceiver device and transmitting a busy signal to said transceiver station;

receiving said busy signal at said transceiver station;

establishing a back-up communications path with a second one of said mobile transceiver devices; and repeating said step of transmitting a signal to said mobile transceiving device.

9. The method of claim 6 further comprising the step of tracking each of said mobile and fixed transceiver devices, said step of tracking said devices comprising the steps of:

transmitting an interrogation signal in each of a plurality of communication cells located and provided for in said localized area;

receiving a plurality of identification signals from each of said mobile and fixed transceiver devices and identifying a specific communication cell associated with a reception of said signals;

communicating said locational information to each of a plurality of transceiver stations.

* * * * *